United States Patent
Ohma et al.

(10) Patent No.: US 10,411,268 B2
(45) Date of Patent: Sep. 10, 2019

(54) ELECTRODE CATALYST, METHOD FOR PRODUCING THE SAME, AND ELECTRODE CATALYST LAYER USING ELECTRODE CATALYST

(71) Applicants: NISSAN MOTOR CO., LTD., Yokohama-shi, Kanagawa (JP); ISHIFUKU METAL INDUSTRY CO., LTD., Soka-shi, Saitama (JP)

(72) Inventors: Atsushi Ohma, Kanagawa (JP); Kazuki Arihara, Kanagawa (JP); Yoshihisa Furuya, Kanagawa (JP); Hideo Inoue, Soka (JP); Takehito Nishikawa, Soka (JP)

(73) Assignees: NISSAN MOTOR CO., LTD., Yokohama-shi (JP); ISHIFUKU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/306,208

(22) PCT Filed: May 10, 2017

(86) PCT No.: PCT/JP2017/017744
§ 371 (c)(1),
(2) Date: Nov. 30, 2018

(87) PCT Pub. No.: WO2017/208761
PCT Pub. Date: Dec. 7, 2017

(65) Prior Publication Data
US 2019/0165382 A1  May 30, 2019

(30) Foreign Application Priority Data

Jun. 3, 2016 (JP) .................................. 2016-112177

(51) Int. Cl.
*H01M 4/86* (2006.01)
*H01M 4/88* (2006.01)
(Continued)

(52) U.S. Cl.
CPC ......... *H01M 4/926* (2013.01); *H01M 4/8652* (2013.01); *H01M 4/88* (2013.01);
(Continued)

(58) Field of Classification Search
CPC .... H01M 4/8652; H01M 4/88; H01M 4/9016; H01M 4/926; H01M 8/10
See application file for complete search history.

(56) References Cited

U.S. PATENT DOCUMENTS

2009/0202869 A1  8/2009  Sawaki et al.

FOREIGN PATENT DOCUMENTS

| JP | 2004-363056 A | 12/2004 |
| JP | 2005-270864 A | 10/2005 |

(Continued)

*Primary Examiner* — Brittany L Raymond
(74) *Attorney, Agent, or Firm* — Foley & Lardner LLP

(57) ABSTRACT

Provided is an electrode catalyst having enhanced catalytic activity (oxygen reduction reaction (ORR) specific activity). Disclosed is an electrode catalyst containing a catalyst metal particle(s) and a spacer(s) supported on a catalyst support, in which a ratio ($d_{sp}/d_{cat}$) of an average diameter of the spacer(s) ($d_{sp}$) with respect to an average diameter of the catalyst metal particle(s) ($d_{cat}$) is from 3.5 to 10.

8 Claims, 3 Drawing Sheets

(51) Int. Cl.
    *H01M 4/90*      (2006.01)
    *H01M 4/92*      (2006.01)
    *H01M 8/10*      (2016.01)
    *H01M 8/1018*    (2016.01)

(52) U.S. Cl.
    CPC ........... *H01M 4/9016* (2013.01); *H01M 8/10* (2013.01); *H01M 2008/1095* (2013.01)

(56) References Cited

FOREIGN PATENT DOCUMENTS

| | | |
|---|---|---|
| JP | 2008-123860 A | 5/2008 |
| JP | 2008-181696 A | 8/2008 |
| WO | WO 2007/145215 A1 | 12/2007 |

ELECTRODE CATALYST, METHOD FOR PRODUCING THE SAME, AND ELECTRODE CATALYST LAYER USING ELECTRODE CATALYST

TECHNICAL FIELD

The present invention relates to an electrode catalyst, a method for producing the same, and an electrode catalyst layer that uses the electrode catalyst.

BACKGROUND ART

A solid polymer electrolyte fuel cells (PEFC) using a proton conductive solid polymer membrane works at a lower temperature than other types of fuel cells, for example, solid oxide fuel cells and molten carbonate fuel cells. For this reason, the polymer electrolyte fuel cell is expected as a stationary power source and a power source for moving bodies such as motor vehicles, and it has been started to put the polymer electrolyte fuel cells to practical use as well.

In such a solid polymer type fuel cell, generally, highly expensive metal catalysts represented by platinum (Pt) or Pt alloys are used, and the metal catalysts have caused the high prices of such fuel cells. Therefore, there is a demand for the development of a technology capable of reducing the amount of use of noble metal catalysts and reducing the production cost of fuel cells.

JP 2008-181696 A discloses a catalyst for fuel cells, the catalyst having metal oxide microparticles and platinum-based metal catalyst microparticles supported on a carbon support.

SUMMARY OF INVENTION

However, the catalyst described in JP 2008-181696 A still cannot exhibit sufficient catalytic activity.

Therefore, the present invention was achieved in view of such circumstances, and it is an object of the invention to provide an electrode catalyst capable of enhancing the catalytic activity.

The inventors of the present invention conducted a thorough investigation in order to solve the problems described above. As a result, the inventors found that the problems can be solved by an electrode catalyst in which a catalyst metal particle(s) and a spacer (s) having a particular average diameter ratio are co-supported on a catalyst support. Thus, the inventors completed the present invention.

DESCRIPTION OF EMBODIMENTS

An electrode catalyst according to the present invention has a catalyst metal particle(s) and a spacer(s) supported on a catalyst support, and a ratio ($d_{sp}/d_{cat}$) of an average diameter of the spacer(s) ($d_{sp}$) with respect to an average diameter of the catalyst metal particle(s) ($d_{cat}$) is from 3.5 to 10. When the electrode catalyst according to the present invention and an electrolyte are mixed to form a catalyst layer, the spacer suppresses or prevents the catalyst metal particles from being completely covered by the electrolyte. Therefore, the poisoning action which the catalyst metal particle receives is attenuated, and the catalytic activity (particularly, oxygen reduction reaction (ORR) activity and/or ORR specific activity) is enhanced.

It is described in JP 2008-181696 A that the disclosed catalyst has high catalytic activity (paragraph "0014"). However, it still could not be said that the above-mentioned catalyst had sufficient catalytic activity. In JP 2008-181696 A, the catalyst is produced by supporting metal oxide microparticles on a carbon support and then supporting platinum-based metal catalyst microparticles (catalyst metal particles) thereon. Since the catalyst metal particle has a strong interaction with the metal oxide microparticle, in the case of this production method, a significant quantity of the catalyst metal particles are not directly supported on the carbon support but are supported on the metal oxide microparticles that are supported on the carbon support. As a result, the catalyst metal particles are localized on protrusions of the catalyst. Therefore, when a catalyst layer is formed by mixing the catalyst with an electrolyte, most of the catalyst metal particles are covered by the electrolyte. Therefore, the chance for reactive gas (particularly, oxygen) to be brought into contact with the catalyst metal particle surface is reduced (the poisoning action which the catalyst metal particle receives is increased), and the catalytic activity of the catalyst metal particle(s) is impaired.

Figure 4:
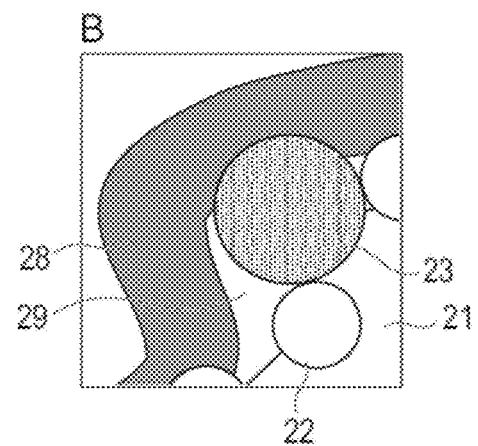
FIG. 4 is a magnified view of the interface between the electrode catalyst and the electrolyte illustrated in FIG. 3.

In this regard, the electrode catalyst according to the present invention can exhibit high catalytic activity (particularly, oxygen reduction reaction (ORR) activity and/or ORR specific activity), even when the electrode catalyst is mixed with an electrolyte to form a catalyst layer. The inventors of the present invention found that an electrode catalyst can be effectively utilized by forming a three-phase interface (reaction site) by means of reactive gas (particularly, oxygen), a catalyst metal particle, and water. From this, the present inventors thought that when a catalyst layer is formed by mixing the electrode catalyst with an electrolyte, the electrolyte brings poisoning action to the catalyst metal particles and lowers the catalytic activity. That is, the inventors thought that as the coverage of the catalyst metal particles by the electrolyte is lower, the apparent ORR activity (ORR specific activity) is enhanced. Here, the "poisoning action" means that since the interaction between an electrolyte and a catalyst metal particle is strong, the chance for reactive gas (particularly oxygen) to be brought into contact with the surface of the catalyst metal particle is reduced. Based on the findings described above, the inventors of the present invention conducted a thorough investigation on the design of the electrode catalyst, for the purpose of reducing the coverage of the catalyst metal particles) by the electrolyte, that is, for the purpose of reducing the poisoning action which the catalyst metal particle receives. As a result, the inventors found that the coverage of the catalyst metal particles by the electrolyte (poisoning action) can be reduced by controlling the catalyst metal particle(s) and the spacer(s) that are supported on the catalyst support, to have a particular average diameter ratio. More particularly, in the electrode catalyst according to the present invention, a catalyst metal particle ("22" in FIG. 1) and a spacer ("23" in FIG. 1) that is larger than the catalyst metal particle co-exist on the surface of a catalyst support. The spacer has an outer circumferential region ("24" in FIG. 2) that is located on the outer side of the particle diameter than the catalyst metal particle. When an electrode catalyst having such a configuration is mixed with an electrolyte, since the electrolyte (particularly, polymer electrolyte) is viscous, as illustrated in FIG. 4, a void ("29" in FIG. 4) is formed between the electrolyte, the spacer, the catalyst metal particle, and the catalyst support. A part of the catalyst metal particle surface touching the void is not brought into contact with the electrolyte. The catalyst metal particle that is not in contact with the electrolyte is hardly subjected to, or is not subjected to, the poisoning action caused by the electrolyte. As a result, the chance for reactive gas (particularly oxygen) to be brought into contact with the catalyst metal particle surface is increased, and the formation of a three-phase interface between reactive gas (particularly oxygen), the catalyst metal particle, and water is promoted. Thus, the catalytic activity (particularly, the ORR specific activity) is enhanced. The above-described mechanism is only a speculation, and the present invention is not intended to be limited by the above-described speculation.

Therefore, the electrode catalyst of the present invention can have enhanced catalytic activity (particularly, ORR specific activity).

In the following description, embodiments of the electrode catalyst according to the present invention and an electrode catalyst layer using this will be explained. Meanwhile, the present invention is not intended to be limited to the following embodiments only. Furthermore, the dimensional ratios of the drawings are exaggerated for the convenience of explanation and may be different from the actual ratios.

In the present specification, the expression "X to Y" represents a range including X and Y, and the expression means "X or more and Y or less". In the present specification, the "maximum diameter" of a particle refers to the longest length among the distances between any arbitrary two points on the contour line of the particle. Furthermore, unless particularly stated otherwise, the operations and the measurements of physical properties and the like are measured under the conditions of room temperature (20° C. to 25° C.)/relative humidity of 40% to 50%.

<Electrode Catalyst>

The electrode catalyst according to the present invention is formed by supporting a catalyst metal particle(s) and a spacer(s) on a catalyst support, and the ratio ($d_{sp}/d_{cat}$) of an average diameter of the spacer(s) ($d_{sp}$) with respect to an average diameter of the catalyst metal particle(s) ($d_{cat}$) is from 3.5 to 10. In a case in which the ratio $d_{sp}/d_{cat}$ is less than 3.5, the difference in the size between the catalyst metal particle and the spacer is small. Therefore, the effect provided by the spacer for suppressing and preventing the coverage of the catalyst metal particles by an electrolyte is insufficient, and sufficient catalytic activity cannot be exhibited. On the other hand, in a case in which the ratio $d_{sp}/d_{cat}$ is more than 10, it is difficult for the spacer to be supported in unoccupied spaces on the catalyst support, and therefore, the supported ratio of the spacer is decreased. Accordingly, the effect by which the spacer suppresses or prevents the coverage of the catalyst metal by an electrolyte is insufficient, and sufficient catalytic activity cannot be exhibited. The ratio $d_{sp}/d_{cat}$ is preferably from 3.7 to 6.0, and more preferably from 3.7 to 5.9. When the ratio is in such a range, in a case in which an electrode catalyst layer is formed using the electrode catalyst and an electrolyte, coverage of the catalyst metal particle surface by the electrolyte is more satisfactorily suppressed by the effect of the spacer. Therefore, an electrode catalyst formed by supporting a catalyst metal particle(s) and a spacer(s) in such a range can have further enhanced catalytic activity (particularly, ORR specific activity).

In regard to the electrode catalyst of the present invention, the catalyst metal particle(s) and the spacer(s) substantially exist on the surface of the catalyst support. Here, the phrase "the catalyst metal particle(s) and the spacer(s) substantially exist on the surface of the catalyst support" implies that substantially all of the catalyst metal particles and the spacers exist on the surface of the catalyst support. Specifically, the phrase implies that the number of the catalyst metal particle(s) supported on the catalyst support, with the spacer(s) being interposed therebetween, is 30% or less, and preferably less than 20%, with respect to the total number of the catalyst metal particles. Meanwhile, the term "catalyst metal particle(s) supported on the catalyst support, with the spacer(s) being interposed therebetween" refers to a catalyst metal particle(s) supported on the surface of the spacer, in a state of being in contact with the spacer(s) only, without contacting the catalyst support. Specifically, such a catalyst metal particle refers to a catalyst metal particle 22' in FIG. 1. That is, according to a preferred embodiment of the present invention, the number of the catalyst metal particle(s) supported on the catalyst support, with the spacer(s) being interposed therebetween, is less than 20% with respect to the total number of the catalyst metal particles. More preferably, the number of the catalyst metal particle(s) supported on the catalyst support, with the spacer(s) being interposed therebetween, is 15% or less, 10% or less, 9% or less, 8% or less, 7% or less, 6% or less, 5% or less, 4% or less, 3% or less, 2% or less, or 1% or less, with respect to the total number of the catalyst metal particles supported on the catalyst support, and it is more preferable as this value is smaller (lower limit: 0%). When the value is in such a range, almost no catalyst metal particle exists on the protrusions of the electrode catalyst. Therefore, when the electrode catalyst and the electrolyte are mixed, the number of the catalyst metal particles existing in a void formed between the electrolyte, the spacer, and the catalyst support can be further increased. Therefore, the surface area of the catalyst metal particles covered by the electrolyte can be reduced more effectively. As a result, the chance for reactive gas (particularly, oxygen) to be brought into contact with the catalyst metal particle surface increases, and the formation of a three-phase interface by the reactive gas (particularly, oxygen), the catalyst metal particle, and water is accelerated. Thus, the catalytic activity is enhanced. Here, regarding the proportion of the number of the catalyst metal particle (s) supported on the catalyst support, with the spacer(s) being interposed therebetween, with respect to the total number of the catalyst metal particles supported on the catalyst support, a value measured according to the following method is employed.

[Method for Calculating Proportion of Number of Catalyst Metal Particles Supported on Catalyst Support, with the Spacer being Interposed Therebetween, with Respect to Total Number of Catalyst Metal Particles Supported on Catalyst Support]

0.01 g of an electrode catalyst is observed under a scanning electron microscope (SEM) (1,000,000 times) manufactured by JEOL, Ltd. The number of catalyst metal particles supported on the catalyst support in a visual field of 250 nm×250 nm is measured, and this is designated as the total number of catalyst metal particle(s) (X particle(s)) supported on the catalyst support. Furthermore, in a visual field such as described above, catalyst metal particle(s) supported on the catalyst support, with a spacer(s) being interposed therebetween, are measured, and this is designated as the number of catalyst metal particles (Y particle(s)) supported on the catalyst support, with the spacer(s) being interposed therebetween. Based on these values, the proportion (%) of the number of catalyst metal particle(s) supported on the catalyst support, with the spacer(s) being interposed therebetween, with respect to the total number of catalyst metal particle(s) supported on the catalyst support [=(Y/X)×100] is determined. The measurement conditions described above may be modified as appropriate. The method described above is only an example, and even in a case in which the proportion is calculated using a method other than the method described above, substantially an equivalent proportion is calculated.

Furthermore, in a case in which the differences in the size of the catalyst metal particles can be neglected (for example, the standard deviation of the particle size is ±30% or less), this value can be handled to be equivalent to percentage by weight (wt %) or percentage by volume (vol %). That is, in this case, the amount of the catalyst metal particles supported on the catalyst support, with the spacer(s) being interposed therebetween, is preferably less than 20% by weight, 15% by weight or less, 10% by weight or less, 9% by weight or less, 8% by weight or less, 7% by weight or less, 6% by weight or less, 5% by weight or less, 4% by weight or less, 3% by weight or less, 2% by weight or less, or 1% by weight or less, with respect to the total amount of the catalyst metal particles supported on the catalyst support, and it is more preferable as the value is smaller (lower limit: 0% by weight). Meanwhile, the term "catalyst metal particle(s) supported on the catalyst support" includes not only a catalyst metal particle supported on the outer surface of the catalyst support but also a catalyst metal particle supported on the pore surface inside the catalyst support.

Figure 1:
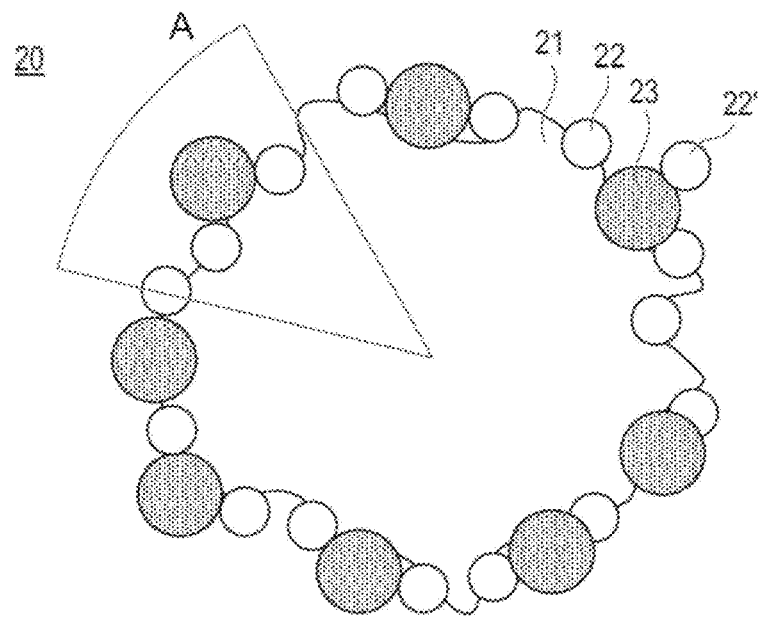
FIG. 1 is a schematic cross-sectional view illustrating an electrode catalyst according to an embodiment of the present invention.

FIG. 1 is a schematic cross-sectional view illustrating an electrode catalyst according to an embodiment of the present invention. The electrode catalyst 20 according to the present embodiment has a configuration in which catalyst metal particles 22 and 22' and a spacer 23 larger than the catalyst metal particles are supported on the surface of a catalyst support 21. The catalyst metal particle 22 is directly supported on the surface of the catalyst support 21 and is substantially not supported by means of the spacer 23 supported on the catalyst support 21. That is, the catalyst metal particle 22 and the spacer 23 exist substantially on the surface of the catalyst support 21. Furthermore, it is preferable that the spacer 23 exists in the vicinity of the catalyst metal particle 22 on the surface of the catalyst support 21. Here, the phrase "exists in the vicinity" implies existing to be adjacent, or adjoining while being separated by a gap. Thereby, the number of catalyst metal particles existing in the void formed between the electrolyte, the spacer, and the catalyst support is further increased, and the surface area of the catalyst metal particles that is not covered by the electrolyte can be increased more effectively. In the following description, the term "catalyst metal particle(s) that is/are not covered by the electrolyte" is also referred to as "non-covered catalyst metal particle(s)".

Figure 2:
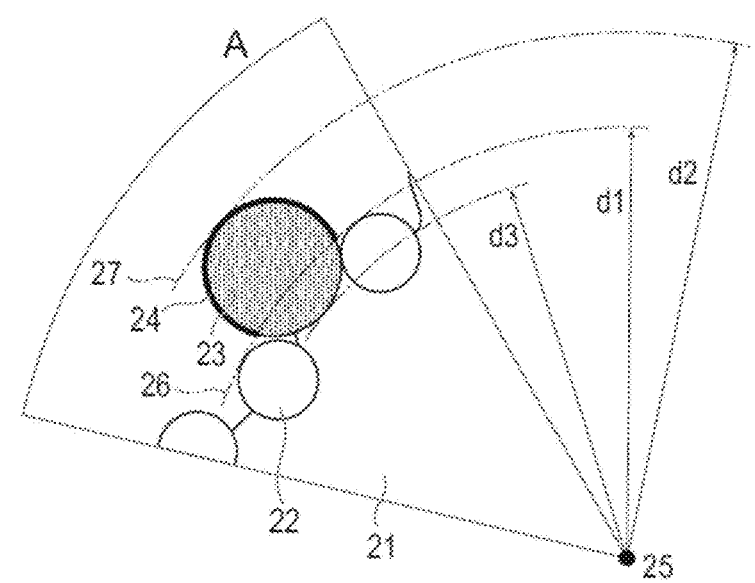
FIG. 2 is a diagram illustrating in detail the correlation between a catalyst metal particle and a spacer existing in the nearest vicinity of the catalyst metal particle in the electrode catalyst of FIG. 1.

FIG. 2 is a diagram illustrating the correlation between a catalyst-metal particle and a spacer existing in the nearest vicinity of the catalyst metal particle in the electrode catalyst of FIG. 1 (magnified view of the part surrounded by line A in FIG. 1). In FIG. 2, a spacer 23 existing in the nearest vicinity of a catalyst metal particle 22 has an outer circumferential region 24 that is located on the outer side of the particle diameter of the catalyst metal particle 22. In other words, when the radius of a circle 26 circumscribing the catalyst metal particle 22 is designated as $d_1$, and the radius of a circle 27 circumscribing the spacer 23 is designated as $d_2$, respectively with reference to the center 25 of the catalyst support, the relation: $d_1 < d_2$ establishes. When an electrode catalyst having such a configuration is mixed with an electrolyte, the protruding spacer acts as a steric hindrance, and thus the viscous electrolyte (for example, polymer electrolyte) cannot be brought into contact, or can be only partially brought into contact, with the catalyst metal particle existing in the vicinity of the spacer. Therefore, voids as described below can be easily formed between the catalyst metal particle(s) and the electrolyte, and the surface area of the non-covered catalyst metal particle(s) can be increased. Here, the "spacer existing in the nearest vicinity of the catalyst metal particle" refers to a spacer for which, when a catalyst metal particle is observed using an observation means such as a scanning electron microscope (SEM), the distance between the center of this catalyst metal particle and the center of the spacer is the shortest.

Figure 3:
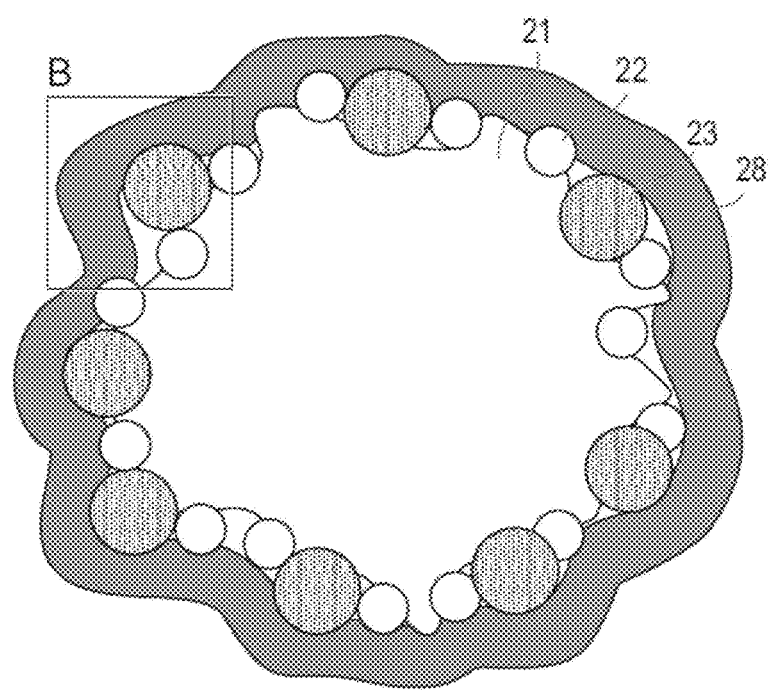
FIG. 3 is a schematic cross-sectional view illustrating the state in which the electrode catalyst according to an embodiment of the present invention is covered with an electrolyte.

FIG. 3 is a schematic cross-sectional view illustrating the state in which the electrode catalyst according to an embodiment of the present invention is covered with an electrolyte. Furthermore, FIG. 4 is a magnified view of the interface between the electrode catalyst and the electrolyte in FIG. 3 (magnified view of the part surrounded by line B in FIG. 3). On the surface of the catalyst support 21 of the electrode catalyst, a spacer 23 that is larger than a catalyst metal particle 22 exists in the vicinity of the catalyst metal particle 22. Therefore, even if the electrode catalyst 20 is covered with an electrolyte 28, since the spacer acts as a steric hindrance, the surface of the catalyst metal particle 22 is not completely covered by the electrolyte 28. As a result, as illustrated in FIG. 4, a void 29 is formed between the catalyst support 21, the catalyst metal particle 22, the spacer 23, and the electrolyte 28. That is, the portion of the surface of the catalyst metal particle 22 that is in contact with the void 29, is not brought into contact with the electrolyte 28. A catalyst metal particle that is not in contact with the electrolyte as such is not easily subjected to, or is not subjected to, the poisoning action caused by the electrolyte. As a result, the chance for oxygen to be brought into contact with the catalyst metal particle surface is increased, the formation of a three-phase interface between the reactive gas (particularly oxygen), the catalyst metal particle, and water is promoted, and thus the catalytic activity (ORR specific activity) is enhanced.

In the following description, the various constituent components of the electrode catalyst according to the present invention will be explained.

[Spacer]

The spacer according to the present invention plays the role of suppressing or preventing the coverage of the catalyst metal particle surface by an electrolyte when the electrode catalyst is mixed with the electrolyte.

Regarding the shape of the spacer, objects having a granular shape, a fiber shape (fibrous shape), a scaly shape, a layered shape or the like can be used; however, a preferred shape is a granular shape or a fiber shape.

According to the present specification, "an average diameter ($d_{sp}$) of the spacer(s)" represents an average height of the spacer(s) supported on the catalyst support. For example, in regard to FIG. 2, when the radius of a circle 27 circumscribing the spacer 23 is designated as $d_2$, and the shortest distance between the center 25 of the catalyst support and the contact point between the spacer 23 and the catalyst support 21 is designated as $d_3$, $d_{sp}$ is a value obtained by subtracting $d_3$ from $d_2$ ($d_2-d_3$). For example, in a case in which the spacer has a granular shape, $d_{sp}$ represents an average primary particle size, and a value calculated as an average value of particle size of the particles observed in several visual fields to several ten visual fields using an observation means such as a scanning electron microscope (SEM) or a transmission electron microscope (TEM) will be employed. Furthermore, in a case in which the spacer has a fiber shape (fibrous shape), $d_{sp}$ represents the diameter (diameter), and similarly, a value calculated by SEM or TEM is employed. The average diameter of the spacer(s) ($d_{sp}$) is not particularly limited as long as the ratio ($d_{sp}/d_{cat}$) between the average diameter of the spacer(s) ($d_{sp}$) and the average diameter of the catalyst metal particle(s) ($d_{cat}$) satisfies in a range of 3.5 to 10. The average diameter ($d_{sp}$) of the spacer(s) is preferably from 5 nm to 40 nm, more preferably from 10 nm to 30 nm, and even more preferably from 12 nm to 20 nm. When the ratio is in such a range, the spacers are supported on the catalyst support in a highly dispersed manner, and the spacers can exhibit the function as a spacer. Furthermore, in a case in which the spacer has a fiber shape (fibrous shape), the length of the fiber is not particularly limited; however, when the dispersibility on the catalyst support or the like is considered, the length of the fiber is about 1 to 50 μm, and preferably 5 to 20 μm.

The supported amount (supported ratio) of the spacer(s) is not particularly limited; however, when the dispersibility on the catalyst support or the like is considered, the supported amount is preferably from 0.5% by weight to 30% by weight, more preferably from 1% by weight to 20% by weight, and even more preferably from 1.5% by weight to 12% by weight, when the weight of the electrode catalyst is designated as 100% by weight. The supported amount of the spacer(s) can be investigated according to a conventionally known method such as inductively coupled plasma emission analysis (ICP atomic emission spectrometry), inductively coupled plasma mass analysis (ICP mass spectrometry), or fluorescent X-ray analysis (XRF).

The ratio ($d_{sp}/d_{sup}$) of the average diameter of the spacer(s) ($d_{sp}$) to the average diameter of the catalyst support(s) ($d_{sup}$) is not particularly limited; however, the ratio is preferably from 0.01 to 0.1, more preferably from 0.02 to 0.08, and even more preferably from 0.03 to 0.06. When the ratio is in such a range, the spacers are supported on the catalyst support in a highly dispersed manner, and the function as a spacer is satisfactorily exhibited.

The material for the spacer may be any of an inorganic compound, an organic compound, and an organic/inorganic hybrid compound; however, from the viewpoint of stability (low reactivity), it is preferable that the spacer is formed of an inorganic compound. Examples of the inorganic compound include, but are not limited to, oxides, nitrides, and the like of metals such as silicon, aluminum, titanium, zirconium, cerium, and tin. Among these, it is more preferable that the spacer is a metal oxide. It is particularly preferable that the spacer includes at least one selected from the group consisting of $SiO_2$, $Al_2O_3$, and $TiO_2$.

Regarding the spacer, any of a synthesized product and a commercially available product may be used. Examples of the commercially available product include SNOWTEX (registered trademark) 20, 30, 40, OS, O, OS, OXS, XS, 0-40, C, N, S, 20L, OL (all manufactured by Nissan Chemical Industries, Ltd.), $SiO_2$: Product No. 637238, 637246, and 791334; $Al_2O_3$: Product No. 718475, 634131, 551643, 790915, and 790923; and $TiO_2$: Product No. 718467, 798525, 798509, and 798495 (all manufactured by Sigma-AldrichCo. LLC.). The spacers mentioned above may be used singly, or two or more kinds thereof may be used in combination.

[Catalyst Support]

The catalyst support functions as a support for supporting the catalyst metal particle(s) which will be described below and the spacer(s), and as an electron conduction path participating in the donation and acceptance of electron between the catalyst particles and other members. Regarding the catalyst support, any support material may be used as long as it has a specific surface area for supporting the catalyst metal particles in a desired dispersed state, and the catalyst support may be any of a carbon support and a non-carbon support. Here, the term "carbon support" refers to a support containing carbon atoms as a main component. The phrase "contains carbon atoms as a main component" is a concept including both "composed only of carbon atoms" and "substantially composed of carbon atoms", and elements other than carbon atoms may also be included. The phrase "substantially composed of carbon atoms" means that incorporation of impurities at a proportion of 2% to 3% by weight or less is acceptable. A non-carbon support refers to a support that does not fall under the definition of the carbon support as described above, and examples include metal oxides.

Specific examples of the carbon support include acetylene black, Ketjen black, thermal black, oil furnace black, channel black, lampblack, and graphitized carbon. More specific examples include VULCAN (registered trademark) XC-72R, VULCAN (registered trademark) P, BLACK PEARLS (registered trademark) 880, BLACK PEARLS (registered trademark) 1100, BLACK PEARLS (registered trademark) 1300, BLACK PEARLS (registered trademark) 2000, REGAL (registered trademark) 400 (all manufactured by Cabot Japan K.K.), KETJENBLACK (Registered trademark) EC300J, KETJENBLACK (registered trademark) EC600JD (all manufactured by Lion Specialty Chemicals Co., Ltd.), #3150, #3250 (manufactured by Mitsubishi Chemical Corp.), and DENKA BLACK (registered trademark) (manufactured by Denka Company Limited.).

Regarding the shape of the catalyst support, the catalyst support can have any arbitrary shape such as a granular shape, a plate shape, a pillar shape, a tubular shape, or an irregular shape.

The size of the catalyst support is not particularly limited. From the viewpoint of controlling the ease of supporting, the catalyst utilization factor, and the thickness of the electrode catalyst layer to be in appropriate ranges, an average diameter of the catalyst support(s) ($d_{sup}$) is preferably 100 to 2,000 nm, more preferably 200 to 1,000 nm, and even more preferably 300 to 500 nm. Furthermore, in a case in which primary particles are connected or aggregated to form a catalyst support, an average primary particle size is preferably 5 to 30 nm, and more preferably 10 to 20 nm. Regarding the average primary particle size, a value measured by SEM or TEM is employed. The "average diameter of the catalyst support (s) ($d_{sup}$)" can be measured as the average value of the crystallite diameter that is determined from the half-value width of a diffraction peak of the catalyst support in X-ray diffraction (XRD), or as the average value of the particle size of the catalyst support that is detectable by transmission electron microscopy (TEM). In the present specification, the "average diameter of the catalyst support(s) ($d_{sup}$)" is the average value of the maximum diameter of the catalyst support that is detectable from transmission electron microscopic image for a statistically meaningful number (for example, at least 200, and preferably at least 300) samples.

The BET specific surface area of the catalyst support is desirably a specific surface area sufficient for supporting the catalyst metal particles and the spacers in a highly dispersed manner, and the BET specific surface area is preferably 10 to 5,000 $m^2/g$, more preferably 50 to 2,000 $m^2/g$, even more preferably 100 to 1,000 $m^2/g$, and particularly preferably 300 to 800 $m^2/g$. With such a specific surface area, sufficient catalyst metal particles can be supported on the catalyst support, and high catalytic activity can be exhibited.

The "BET specific surface area ($m^2/g$ of the support)" of the support is measured by a nitrogen adsorption method. More particularly, about 0.04 to 0.07 g of a catalyst powder is precisely weighed and sealed in a sample tube. This sample tube is preliminarily dried in a vacuum dryer at 90° C. for several hours, and the content is used as a sample for measurement. For the weighing, an electronic balance (AW220) manufactured by SHIMADZU CORPORATION is used. In the case of a coated sheet, a net mass of about 0.03 to 0.04 g of the coating layer calculated by subtracting the mass of TEFLON (registered trademark) (base material) having the same area from the total mass of the coated sheet is used as the sample mass. Next, the BET specific surface area is measured under the following measurement conditions. A BET plot is produced over a relative pressure ($P/P_0$) range of about 0.00 to 0.45 on the adsorption side of an adsorption/desorption isotherm, and the BET specific surface area is calculated from the gradient and the intercept.

[Chem. 1]
<Measurement Conditions>
Measuring apparatus: Fully automated high-precision gas adsorption
apparatus manufactured by BEL Japan, Inc., BELSORP36
Adsorption gas: $N_2$
Dead volume measurement gas: He
Adsorption temperature: 77 K (liquid nitrogen temperature)
Treatment before measurement: Vacuum drying at 90° C. for several hours (after He purge, mounted on a measurement stage)
Measurement mode: Isothermal adsorption process and desorption process
Relative measurement pressure $P/P_0$: About 0 to 0.99
Balance set time: 180 sec for 1 relative pressure

[Catalyst Metal Particle(s)]

The catalyst metal particle has a function of implementing catalytic action in an electrochemical reaction. Regarding the catalyst metal particle, a catalyst metal particle containing at least platinum is preferably used in order to enhance the catalytic activity, the resistance to poisoning against carbon monoxide or the like, heat resistance, and the like. That is, the catalyst metal particle contains platinum, or contains platinum and a metal component other than platinum.

Regarding the metal component other than platinum, any known catalyst component can be similarly used without any particular limitations, and specific examples include metals such as ruthenium, iridium, rhodium, palladium, osmium, tungsten, lead, iron, copper, silver, chrome, cobalt, nickel, manganese, vanadium, molybdenum, gallium, aluminum, and zinc. The metal component other than platinum may be one kind of metal or a mixture of two or more kinds. Among them, from the viewpoint of the catalytic performance, the metal component is preferably a transition metal. Here, a transition metal atom refers to the atoms of elements ranging from an element of Group 3 to an element of Group 12, and the type of the transition metal atom is not particularly limited. From the viewpoint of the catalytic activity, it is preferable that the transition metal atom is selected from the group consisting of vanadium, chromium, manganese, iron, cobalt, copper, zinc, and zirconium.

A composition of the alloy may be varied depending on the kind of the metal to be alloyed, but for example, it is preferable that a content of platinum is set to from 30% to 90% by atom and a content of the metal to be alloyed with platinum is set to from 10% to 70% by atom. Incidentally, an alloy is generally a generic term that it comprises one or more kinds of metal elements or non-metal elements added to a metal element and has metallic properties. As the construction of the alloy, there are a eutectic alloy of a so-called mixture in which constituent elements are separate crystals, one in which constituent elements completely melt into each other to form a solid solution, one in which constituent elements form an intermetallic compound or a compound of a metal and a nonmetal, and the like, and the construction of the alloy may be any of these in the present embodiment.

The shape of the catalyst metal particle is not particularly limited, and the shape may be a spherical shape, a plate shape, a needle shape, a pillar shape, a rectangular shape, a polyhedral shape, or the like.

An average diameter of the catalyst metal particle(s) ($d_{cat}$) is preferably from 1 nm to 30 nm, more preferably from 2 nm to 10 nm, and even more preferably from 3 nm to 5 nm. When the average diameter is in such a range, dissolution or aggregation of the catalyst metal particles can be suppressed, while the activity per unit weight (weight specific activity) of the catalyst metal particle(s) is increased. In the present specification, the "average diameter of the catalyst metal particle (s) ($d_{cat}$)" represents the maximum diameter of the catalyst metal particle(s). In a case in which the catalyst metal particle has a spherical shape, $d_{cat}$ represents an average crystallite diameter. The "average crystallite diameter" is calculated using Scherrer's equation from an XRD spectrum near 41°, which originates from Pt(111). In addition, there are occasions in which the size of the particles is represented as the average particle size; however, the average particle size is substantially equivalent to the average crystallite diameter representing the size of the catalyst metal particle(s). Therefore, it is also preferable that the average particle size of the catalyst metal particle(s) is in the range described above. Meanwhile, the "average particle size" is the average value of the particle sizes of particles observed in several visual fields to several ten visual fields using an observation means such as scanning electron microscopy (SEM) or transmission electron microscopy (TEM).

The supported amount (supported ratio) of the catalyst metal particles is not particularly limited; however, when the weight of an electrode catalyst precursor (total weight of the catalyst support and the catalyst metal particles) is designated as 100% by weight, the supported amount is preferably from 2% by weight to 60% by weight. When the supported amount is adjusted to such a range, aggregation between catalyst metal particles is suppressed, and an increase in the thickness of the electrode catalyst layer can be suppressed, which is preferable. The supported amount is more preferably from 5% by weight to 50% by weight, even more preferably from 10% by weight to 40% by weight, and particularly preferably from 20% by weight to 30% by weight. When the supported amount is in such an amount, the balance between the dispersibility of the catalyst metal particles on the catalyst support and the catalytic activity can be appropriately controlled. Meanwhile, the supported amount of the catalyst metal particles can be examined according to any conventionally known method such as inductively coupled plasma emission analysis (ICP atomic emission spectrometry), inductively coupled plasma mass analysis (ICP mass spectrometry), or fluorescent X-ray analysis (XRF).

In regard to the electrode catalyst according to the present invention, it is preferable that the supported amount of the catalyst metal particles is larger than the supporting amount of the spacer. Specifically, the proportion of the supported amount of the catalyst metal particles with respect to the supporting amount of the spacer (=supported amount of catalyst metal particle(s)/supported amount of spacer(s)) is preferably from 1.1 times to 50 times, more preferably from 1.5 times to 20 times, and even more preferably from 2.0 times to 15 times. With such a mixing proportion between the catalyst metal particles and the spacers, the catalyst metal particle(s) and the spacer(s) exist sufficiently close to each other on the catalyst support. Therefore, when the electrode catalyst is mixed with an electrolyte, the spacer acts satisfactorily as a steric hindrance and more effectively suppresses or prevents the electrolyte from being brought into contact with the catalyst metal particle(s) existing in the vicinity of the spacer(s). Therefore, voids are formed more efficiently between the catalyst metal particle(s) and the electrolyte, and the surface area of non-covered catalyst metal particles can be further increased.

[Method for Producing Electrode Catalyst]

The electrode catalyst according to the present invention may be produced by any method as long as the electrode catalyst has the configuration described above. According to a preferred embodiment of the present invention, the electrode catalyst according to the present invention is produced by a step of supporting the catalyst metal particle(s) on the catalyst support to produce an electrode catalyst precursor (Step 1); and a step of supporting the spacer(s) on the electrode catalyst precursor (Step 2). Since small catalyst metal particles are first supported on a catalyst support and then large spacers are supported as such, most of the spacers are not disposed on the smaller catalyst metal particles. Furthermore, although a spacer exists on the catalyst metal particle, since the spacer exists unstably on the catalyst metal particle due to the difference in size, the spacer moves onto the catalyst support to exist more stably. Therefore, when the electrode catalyst is produced in this order, theoretically there is no catalyst metal particle supported on the catalyst support, with the spacer being interposed therebetween. That is, for example, as illustrated in FIG. 2, the spacer 23 is supported on the surface of the catalyst support 21 in the form of being protruded (having an outer circumferential region 24), as compared to the catalyst metal particle 22 in the vicinity. Thereby, when an electrode catalyst layer is formed by mixing the electrode catalyst with an electrolyte, the amount (surface area) of the catalyst metal particles that are in contact with the electrolyte can be reduced. As a result, the chance for reactive gas (particularly oxygen) to be brought into contact with the catalyst metal particle surface is increased, the formation of a three-phase interface between the reactive gas, the catalyst metal particle, and water is promoted, and thus high catalytic activity can be exhibited. That is, the method for producing an electrode catalyst according to an embodiment of the present invention is a method for producing an electrode catalyst, which has supporting a catalyst metal particle(s) on a catalyst support to produce an electrode catalyst precursor, and mixing the electrode catalyst precursor with a spacer(s) to produce the electrode catalyst.

(Step 1: Production of Electrode Catalyst Precursor)

The method for producing an electrode catalyst precursor (method for supporting the catalyst metal particle(s) on the catalyst support) is not particularly limited, and any conventionally known method can be used. For example, methods such as a liquid phase reduction method, an evaporation and drying method, a colloid adsorption method, a spraying and thermal decomposition method, and reverse micelles (microemulsion method) can be used.

Examples of the liquid phase reduction method include a method of depositing the catalyst metal particle(s) on the surface of the catalyst support and then subjecting the catalyst metal particle(s) to a heat treatment. Specific example, for example, a method of immersing a catalyst support in a solution of a precursor of the catalyst metal particle to reduce the precursor and then subjecting the catalyst metal particle(s) to a heat treatment method may be mentioned.

The precursor of the catalyst metal particle is not particularly limited and is appropriately selected depending on the kind of the catalyst metal particle to be used. Specific examples thereof may include a chloride, a nitrate, a sulfate, a chloride, an acetate, and an amine compound of the catalyst metals such as platinum. More specific examples thereof may preferably include chlorides such as platinum chloride (hexachloroplatinic acid hexahydrate), palladium chloride, rhodium chloride, ruthenium chloride, and cobalt chloride; nitrates such as palladium nitrate, rhodium nitrate, and iridium nitrate; sulfates such as palladium sulfate and rhodium sulfate; acetates such as rhodium acetate; and ammine compounds such as dinitrodiammine platinum nitrate and dinitrodiammine palladium. A solvent to be used in the preparation of a precursor solution of catalyst metal is not particularly limited as long as it can dissolve a precursor of the catalyst metal, and it can be appropriately selected depending on the kind of the precursor of the catalyst metal to be used. Specifically, examples thereof may include water, an acid, an alkali, and an organic solvent. A concentration of the precursor of the catalyst metal in the precursor solution of the catalyst metal is not particularly limited, but it is preferably from 0.1% to 50% by weight and more preferably from 0.5% to 20% by weight in terms of metal.

Examples of the reductant may include hydrogen, hydrazine, sodium borohydride, sodium thiosulfate, citric acid, sodium citrate, L-ascorbic acid, sodium borohydride, formaldehyde, methanol, ethanol, ethylene, and carbon monoxide. Incidentally, a substance, which is gaseous at room temperature, such as hydrogen, can also be supplied by bubbling. An amount of the reductant is not particularly limited as long as the precursor of the catalyst metal can be reduced to the catalyst metal, and a known amount can be applied in the same manner.

The deposition conditions are not particularly limited as long as conditions in which a catalyst metal particle(s) can be deposited on the catalyst support are employed. For example, the deposition temperature is preferably a temperature near the boiling point of the solvent (solvent boiling point ±10° C., more preferably solvent boiling point ±5° C.), and more preferably from room temperature to 100° C. Furthermore, the deposition time is preferably 1 to 10 hours, and more preferably 2 to 8 hours. Meanwhile, the deposition process may be carried out with stirring and mixing, if necessary. Thereby, the precursor of the catalyst metal is reduced, and the catalyst metal particles are produced on the catalyst support.

Regarding the heat treatment conditions, for example, the heat treatment temperature is preferably 300° C. to 1,200° C., more preferably 500° C. to 1,150° C., even more preferably 700° C. to 1,000° C., and particularly preferably 900° C. to 1,000° C. Furthermore, the heat treatment time is preferably 0.02 to 3 hours, more preferably 0.1 to 2 hours, and even more preferably 0.2 to 1.5 hours. Meanwhile, from the viewpoint of an effect of accelerating reduction of the catalyst metal precursor, it is preferable that the heat treatment process is carried out in an atmosphere containing hydrogen gas, and more preferably in a hydrogen atmosphere.

Alternatively, it is also acceptable to produce an electrode catalyst precursor by producing the catalyst metal particle(s) in advance and then supporting the catalyst metal particle(s) on the catalyst support. In the case of this method, highly active catalyst metal particles having a special form can be supported on the catalyst support while maintaining their activity.

(Step 2: Supporting of Spacer(s) on Electrode Catalyst Precursor)

The method for supporting the spacer(s) on the electrode catalyst precursor is not particularly limited, and any conventionally known method can be used. For example, methods such as an adsorption method, an impregnation method, a liquid phase reduction supporting method, an evaporation drying method, a spraying thermal decomposition method, and a sputtering method can be used.

Examples of the adsorption method include a method of dispersing an electrode catalyst precursor and the spacer(s) in a liquid medium, mixing the dispersion, and filtering and drying the resultant.

Here, the means for dispersing the electrode catalyst precursor and the spacer(s) is not particularly limited, and appropriate dispersing means such as a homogenizer, an ultrasonic dispersing apparatus, and a magnetic stirrer may be combined as appropriate. Furthermore, the electrode catalyst precursor and the spacer(s) may be dispersed in a liquid medium all at once, or may be dispersed in two divided parts by, for example, first dispersing the spacer(s) and then dispersing the electrode catalyst precursor.

The liquid medium is not particularly limited as long as the electrode catalyst precursor and the spacer(s) can be uniformly dispersed therein, and examples include n-hexanol. These may be used singly, or two or more kinds thereof may be used in combination.

Regarding the mixing conditions, for example, the mixing temperature is preferably 20° C. to 50° C. The mixing time is preferably 0.5 to 24 hours.

Regarding the drying conditions, for example, the drying temperature is preferably 20° C. to 80° C., and more preferably 40° C. to 60° C. Furthermore, the drying time is preferably 0.5 to 24 hours.

Meanwhile, in the method described above, an electrode catalyst can be obtained by dispersing the electrode catalyst precursor and the spacer(s) in a liquid medium, adsorbing and supporting and the spacer(s), and then filtering and drying the resultant.

<Electrode Catalyst Layer>

The present invention also provides an electrode catalyst layer containing the electrode catalyst described above.

[Electrolyte]

The electrode catalyst layer according to the present invention preferably contains an electrolyte, in addition to the electrode catalyst described above. The electrolyte used in the electrode catalyst layer is not particularly limited; however, from the viewpoint of the difficulties for covering the electrode catalyst, it is preferable that the electrolyte is a polymer (polymer electrolyte).

The polymer electrolyte is not particularly limited, and conventionally known knowledge can be appropriately referred to. The polymer electrolyte is roughly classified into a fluorine-based polymer electrolyte and a hydrocarbon-based polymer electrolyte depending on the kind of ion exchange resin as a constituent material.

Examples of the ion exchange resin constituting the fluorine-based polymer electrolyte may include perfluorocarbon sulfonic acid-based polymers such as Nafion (registered trademark, manufactured by DuPont), Aciplex (registered trademark, manufactured by Asahi Kasei Corp.), and FLEMION (registered trademark, manufactured by Asahi Glass Co., Ltd.), a perfluorocarbon phosphonic acid-based polymer, a trifluorostyrene sulfonic acid-based polymer, an ethylene-tetrafluoroethylene-g-styrene sulfonic acid-based polymer, an ethylene-tetrafluoroethylene copolymer, and a polyvinylidene fluoride-perfluorocarbon sulfonic acid-based polymer. From the viewpoint of excellent heat resistance, chemical stability, durability, and mechanical strength, the fluorine-based polymer electrolytes are preferably used and a fluorine-based polymer electrolyte composed of a perfluorocarbon sulfonic acid-based polymer is particularly preferably used.

Specific examples of the hydrocarbon-based polymer electrolyte may include sulfonated polyethersulfone (S-PES), sulfonated polyarylether ketone, sulfonated polybenzimidazole alkyl, phosphonated polybenzimidazole alkyl, sulfonated polystyrene, sulfonated polyether ether ketone (S-PEEK), and sulfonated polyphenylene (S-PPP). The hydrocarbon-based polymer electrolytes are preferably used from the viewpoint of production that the raw material is inexpensive, the production process is simple, and the selectivity for materials is high. Incidentally, only one kind of the ion exchange resins described above may be used singly or two or more kinds thereof may be used concurrently. In addition, the polymer electrolyte is not limited to the materials described above, and other materials may be used.

Furthermore, the electrolyte included in the electrode catalyst layer of the present invention may include a non-polymer compound to the extent that the operating effects of the present invention are not impaired. This non-polymer compound includes a low molecular weight compound having a weight average molecular weight (Mw) of 10,000 or less, for example, a raw material (for example, a monomer) or an intermediate product (for example, an oligomer) for a polymer electrolyte such as NAFION (registered trademark); however, the non-polymer compound is not limited to this.

[Method for Producing Electrode Catalyst Layer]

The method for producing the electrode catalyst layer is not particularly limited, and an electrode catalyst layer can be obtained by, for example, mixing the electrode catalyst, the electrolyte, a solvent, and other additives as necessary to produce a catalyst ink, and applying and drying this catalyst ink.

The amount of incorporation of the electrolyte in the catalyst ink is not particularly limited; however, the amount of incorporation is preferably from 0.1 parts by weight to 2 parts by weight, more preferably from 0.2 parts by weight to 1 part by weight, and even more preferably from 0.3 parts by weight to 0.5 parts by weight, with respect to 1 part by weight of the electrode catalyst.

The solvent used for the production of a catalyst ink is not particularly limited as long as the solvent can uniformly disperse or dissolve an electrode catalyst and an electrolyte and can be removed after application. Specific examples include lower alcohols having 1 to 6 carbon atoms, such as n-hexanol, cyclohexanol, methanol, ethanol, n-propanol (n-propyl alcohol), isopropanol, n-butanol, sec-butanol, isobutanol, and tert-butanol; propylene glycol, benzene, toluene, and xylene. In addition to these, butyl alcohol acetate, dimethyl ether, ethylene glycol, and the like may be used. These may be used singly or in the form of a mixed liquid of two or more kinds thereof.

The solid content concentration of the catalyst ink is not particularly limited; however, the solid content concentration is preferably 0.1 to 10 mg/mL, more preferably 0.2 to 5 mg/mL, even more preferably 0.3 to 2 mg/mL, and particularly preferably 0.5 to 1 mg/mL.

In the catalyst ink, if necessary, additives such as a water repellant, a dispersant, a thickener, and a pore-forming agent may be incorporated. In the case of using these additives, the amount of addition for each of the additives is preferably 5% to 20% by weight with respect to the total amount of the catalyst ink.

When a catalyst ink such as described above is applied on an object base material, an electrode catalyst layer is formed. At this time, the conditions for forming the electrode catalyst layer are not particularly limited, and known methods can be similarly used, or can be used after appropriate modification is applied. For example, the catalyst ink is applied on an intended substrate such that the thickness after drying becomes a desired thickness, and drying is carried out in a vacuum dryer or under reduced pressure. The drying temperature is not particularly limited; however, the drying temperature is 25° C. to 150° C., more preferably 25° C. to 100° C., and even more preferably 25° C. to 50° C. The drying time is not particularly limited; however, the drying time is 1 to 24 hours, more preferably 5 to 24 hours, and even more preferably 12 to 24 hours.

The film thickness (dried film thickness) of the electrode catalyst layer is preferably 0.05 to 30 μm, more preferably 1 to 20 μm, even more preferably 1 to 10 μm, and particularly preferably 1 to 5 μm. The above-described conditions are applicable to both a cathode catalyst layer and an anode catalyst layer. However, the cathode catalyst layer and the anode catalyst layer may be identical or different.

The electrode catalyst according to the present invention has excellent catalytic activity as well as excellent durability. Therefore, the electrode catalyst according to the present invention can be more suitably applied to fuel cell usage applications where superior performance is required, such as power supplies for domestic use or for driving mobile bodies. That is, a membrane electrode assembly and a fuel cell, both of which have the electrode catalyst according to the present invention in a catalyst layer, exhibit excellent power generation performance. In the following description, a membrane electrode assembly (MEA) and a fuel cell, which include a catalyst layer containing the electrode catalyst according to the present invention, will be explained.

<Membrane Electrode Assembly (MEA)>

The electrode catalyst according to the present invention can be suitably used in a membrane electrode catalyst (MEA). That is, the present invention also provides a membrane electrode assembly (MEA), particularly a membrane electrode assembly (MEA) for a fuel cell, which includes the electrode catalyst of the present invention. Such a membrane electrode assembly (MEA) can exhibit high power generation performance (particularly weight specific activity) and durability.

For the membrane electrode assembly (MEA) including the electrode catalyst of the present invention, a similar configuration can be applied, except that the electrode catalyst (catalyst) according to the present invention is used instead of a conventional electrode catalyst. In the following description, preferred embodiments of the MEA of the present invention will be explained; however, the present invention is not intended to be limited to the following embodiments.

A MEA is configured to include an electrolyte membrane; and an anode catalyst layer and an anode gas diffusion layer, and a cathode catalyst layer and a cathode gas diffusion layer, which are sequentially formed on both surfaces of the electrolyte membrane. In regard to this membrane electrode assembly (MEA), the electrode catalyst according to the present invention is used in at least one of the cathode catalyst layer and the anode catalyst layer.

[Electrolyte Membrane]

The electrolyte membrane is constructed from, for example, a solid polymer electrolyte membrane. This solid polymer electrolyte membrane has a function of, for example, selectively permeating protons produced in an anode catalyst layer to a cathode catalyst layer along the film thickness direction at the time of operating a fuel cell (PEFC or the like). Furthermore, the solid polymer electrolyte membrane also has a function as a barrier for preventing mixing of a fuel gas supplied to the anode side and an oxidizing gas supplied to the cathode side.

The electrolyte material that constitutes the solid polymer electrolyte membrane is not particularly limited, and conventionally known knowledge can be referred to as appropriate. For example, the fluorine-based polymer electrolyte or hydrocarbon-based polymer electrolyte described above can be used. At this time, it is not necessarily essential to use the same polymer electrolyte as that used in the catalyst layer.

The thickness of the electrolyte membrane may be determined as appropriate while the characteristics of the fuel cell thus obtainable are considered, and there are no particular limitations. The thickness of the electrolyte membrane is usually about 5 to 300 μm. When the thickness of the electrolyte membrane has a value in such a range, a balance between the strength at the time of membrane formation, durability at the time of use, and output power characteristics at the time of use can be appropriately controlled.

[Catalyst Layer]

The catalyst layer is a layer in which a cell reaction actually proceeds. Specifically, an oxidation reaction of hydrogen proceeds in the anode catalyst layer, and a reduction reaction of oxygen proceeds in the cathode catalyst layer. Here, the electrode catalyst of the present invention may exist in any of the cathode catalyst layer or the anode catalyst layer. When the necessity for enhancement of the oxygen reduction activity is considered, it is preferable that the electrode catalyst of the present invention is used in at least the cathode catalyst layer. However, the catalyst layer according to the embodiment described above may be used as an anode catalyst layer, or may be used as both a cathode catalyst layer and an anode catalyst layer, without any particular limitations.

The catalyst layer contains the electrode catalyst according to the present invention and an electrolyte. The electrolyte is preferably an ion-conductive polymer electrolyte. Since the polymer electrolyte accomplishes the role of transferring protons generated around a catalytically active material on the fuel electrode side, the polymer electrolyte is also referred to as proton-conductive polymer. Regarding the polymer electrolyte, those compounds listed in the section [Electrolyte] described above can be used.

In the polymer electrolyte responsible for the transfer of protons, conductance of protons is important. When EW of the polymer electrolyte is too large, ion conductivity in the whole catalyst layer decreases. Accordingly, the catalyst layer of the present embodiment preferably contains a polymer electrolyte having a small EW. Specifically, the catalyst layer of the present embodiment preferably contains a polymer electrolyte having an EW of 1500 g/eq. or less, more preferably contains a polymer electrolyte having an EW of 1200 g/eq. or less, and particularly preferably contains a polymer electrolyte having an EW of 1000 g/eq. or less. Meanwhile, when the EW is too small, hydrophilicity becomes too high, and smooth movement of water becomes difficult. From such a viewpoint, the EW of the polymer electrolyte is preferably 600 g/eq. or higher. Meanwhile, the equivalent weight (EW) represents an equivalent weight of an exchange group having proton conductivity. The equivalent weight is the dry weight of an ion exchange membrane per equivalent of an ion exchange group and is represented by the unit "g/eq.".

It is preferable that the catalyst layer contains two or more kinds of polymer electrolytes having different EWs in a power generation surface and a polymer electrolyte having the lowest EW among the polymer electrolytes is used in a region in which relative humidity of gas in a flow path is 90% or less. By adopting such a material disposition, resistance decreases regardless of a current density region and cell performance can be improved. It is desirable that EW of a polymer electrolyte to be used in the region in which the relative humidity of gas in the flow path is 90% or less, namely, a polymer electrolyte having the lowest EW is 900 g/eq. or less. By this, the effect described above can be more reliably and remarkably exerted.

Further, it is desirable to use a polymer electrolyte having the lowest EW in a region in which a temperature is higher than an average temperature of cooling water at an inlet and an outlet. By this, resistance decreases regardless of a current density region and cell performance can be improved.

Furthermore, it is desirable to use a polymer electrolyte having the lowest EW in a region in the range to be within ⅗ from a gas supply port of at least either of a fuel gas or an oxidant gas with respect to a flow path length from the viewpoint of decreasing resistance of a fuel cell system.

A thickness (dried film thickness) of the catalyst layer is preferably from 0.05 to 30 μm, more preferably from 1 to 20 μm, and still more preferably from 2 to 15 μm. Incidentally, the thickness above can be applied to both the cathode catalyst layer and the anode catalyst layer. However, the thicknesses of the cathode catalyst layer and the anode catalyst layer may be the same as or different from each other.

(Gas Diffusion Layer)

Gas diffusion layers (anode gas diffusion layer and cathode gas diffusion layer) serves to promote diffusion of gas (fuel gas or oxidant gas) supplied through gas flow paths of a separator into the catalyst layers and serves as an electron conduction path.

A material constituting the substrate of the gas diffusion layers is not particularly limited, and conventionally known knowledge can be appropriately referred to. Examples thereof may include a sheet-like material exhibiting conductivity and porosity such as a carbon fabric, a paper-like papermaking body, a felt, or a nonwoven fabric. A thickness of the substrate may be appropriately determined in consideration of characteristics of the gas diffusion layer to be obtained, but it may be about from 30 to 500 μm. When the thickness of the substrate is within such a range, balance between mechanical strength and diffusibility of gas, water and the like can be properly controlled.

The gas diffusion layer preferably contains a water repellent for the purpose of further enhancing water repellency and preventing a flooding phenomenon and the like. The water repellent is not particularly limited, but examples thereof may include fluorine-based polymer materials such as polytetrafluoroethylene (PTFE), polyvinylidene fluoride (PVdF), polyhexafluoropropylene, and a tetrafluoroethylene-hexafluoropropylene copolymer (FEP), polypropylene, and polyethylene.

In addition, the gas diffusion layer may have a carbon particle layer (microporous layer; MPL, not illustrated) composed of carbon particles containing a water repellent on the catalyst layer side of the substrate in order to further improve water repellency.

The carbon particles to be contained in the carbon particle layer are not particularly limited, and conventionally known materials such as carbon black, graphite, and expanded graphite can be appropriately adopted. Among these, carbon black such as oil furnace black, channel black, lamp black, thermal black, or acetylene black can be preferably used since it exhibits excellent electron conductivity and has a large specific surface area. An average particle size of the carbon particles is preferably set to about from 10 to 100 nm. This makes it possible to improve contact property with the catalyst layer as well as to obtain high drainage property by capillary force.

Examples of the water repellent to be used in the carbon particle layer may include the same water repellents as those described above. Among these, a fluorine-based polymer material can be preferably used since it exhibits excellent water repellency, corrosion resistance at the time of electrode reaction, and the like.

A mixing ratio of the carbon particles to the water repellent in the carbon particle layer is preferably set to be about from 90:10 to 40:60 (carbon particles:water repellent) in terms of weight ratio in consideration of better balance between water repellency and electron conductivity. A thickness of the carbon particle layer is also not particularly limited and may be appropriately determined in consideration of water repellency of the gas diffusion layer to be obtained.

[Method for Producing Membrane Electrode Assembly]

A method for fabricating the membrane electrode assembly is not particularly limited, and a conventionally known method can be used. It is possible to use, for example, a method of transferring or applying a catalyst layer on an electrolyte membrane by hot pressing, drying this, and bonding a gas diffusion layer to the resultant; or a method of applying a catalyst layer in advance on the microporous layer side of a gas diffusion layer (in the case where the gas diffusion layer does not include a microporous layer, one surface of the base material layer), drying the catalyst layer, thereby producing two sheets of a gas diffusion electrode (GDE), and bonding these gas diffusion electrodes on both surfaces of a solid polymer electrolyte membrane by hot pressing, can be used. The conditions for application and bonding such as hot pressing may be adjusted as appropriate depending on the type of the polymer electrolyte (perfluorosulfonic acid-based or hydrocarbon-based polymer electrolyte) in the solid polymer electrolyte membrane or the catalyst layer.

<Fuel Cell>

The membrane electrode assembly (MEA) described above can be suitably used in a fuel cell. That is, the present invention also provides a fuel cell that is formed using a membrane electrode assembly (MEA) including the electrode catalyst according to the present invention. Such a fuel cell can exhibit superior power generation performance (particularly, weight specific activity) and durability.

Here, the fuel cell has a membrane electrode assembly (MEA); and a pair of separators composed of an anode-side separator having fuel gas flow channels through which a fuel gas flows, and a cathode-side separator having oxidizing gas flow channels through which an oxidizing gas flows. The fuel cell of the present invention has excellent durability and can exhibit superior power generation performance.

In the following description, an embodiment of a membrane electrode assembly (MEA) and a fuel cell, both of which have a catalyst layer using the electrode catalyst according to the present invention, will be explained in detail with reference to the drawings as appropriate. However, the present invention is not limited only to the following embodiment. The respective drawings are described in an exaggerated manner for convenience, and the dimensional ratios of the various constituent elements in the respective drawings may be different from the actual dimensional ratios. Furthermore, when an embodiment of the present invention is explained with reference to the drawings, an identical reference numeral is assigned to identical elements in the explanation for the drawings, and any overlapping description will not be repeated.

Figure 5:
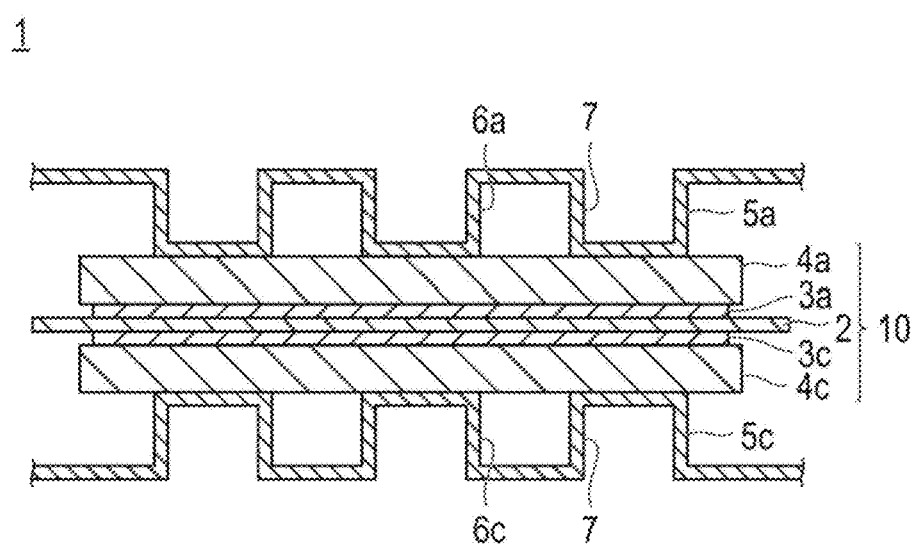
FIG. 5 is a schematic cross-sectional view illustrating the basic configuration of a solid polymer type fuel cell containing the electrode catalyst according to an embodiment of the present invention.

FIG. 5 is a schematic diagram illustrating the basic configuration of a solid polymer type fuel cell (PEFC) 1 according to an embodiment of the present invention. PEFC 1 first has a solid polymer electrolyte membrane 2; and a pair of catalyst layers (anode catalyst layer 3a and cathode catalyst layer 3c) having the electrolyte membrane interposed therebetween. Then, the laminate of the solid polymer electrolyte membrane 2 and the catalyst layers (3a and 3c) are interposed between a pair of gas diffusion layers (GDL) (anode gas diffusion layer 4a and cathode gas diffusion layer 4c). As such, the solid polymer electrolyte membrane 2, a pair of catalyst layers (3a and 3c), and a pair of gas diffusion layers (4a and 4c) constitute, in a laminated state, a membrane electrode assembly (MEA) 10.

In the PEFC 1, MEA 10 is further interposed between a pair of separators (anode separator 5a and cathode separator 5c). In FIG. 5, the separators (5a and 5c) are depicted such that the separators are positioned at both ends of the MEA 10 depicted therein. However, in a fuel cell stack formed by a plurality of MEA's laminated together, it is general that a separator is also used as a separator for an adjacent PEFC (not illustrated in the diagram). In other words, in a fuel cell stack, MEA's constitute a stack by being sequentially laminated, with separators being interposed therebetween. In an actual fuel cell stack, gas seals are disposed between the separators (5a and 5c) and the solid polymer electrolyte membrane 2, or between a PEFC 1 and another PEFC adjacent thereto; however, in FIG. 5, such a description will not be illustrated.

The separators (5a and 5c) are obtained by, for example, molding a thin plate having a thickness of 0.5 mm or less into a concavo-convex shape as illustrated in FIG. 5, by subjecting the thin plate to a pressing treatment. Convexities as viewed from the MEA side of the separator (5a or 5c) are in contact with the MEA 10. Thereby, electrical connection between the convexities and the MEA 10 is secured. Furthermore, concavities (spaces between the separator and the MEA produced due to the concavo-convex shape of the separator) as viewed from the MEA side of the separator (5a or 5c) function as gas flow channels for circulating a gas at the time of operating the PEFC 1. Specifically, a fuel gas (for example, hydrogen) is circulated in a gas flow channel 6a of the anode separator 5a, and an oxidizing gas (for example, air) is circulated in the gas flow channel 6c of the cathode separator 5c.

Meanwhile, the concavities as viewed from the opposite side of the MEA side of the separator (5a or 5c) are regarded as coolant flow channels 7 for circulating a coolant (for example, water) for cooling the PEFC at the time of operating the PEFC 1. Furthermore, a separator is usually provided with a manifold (not illustrated in the diagram). This manifold functions as a connection means for connecting various cells when a stack is constructed. By adopting such a configuration, the mechanical strength of the fuel cell stack can be secured.

In the embodiment illustrated in FIG. 5, the separators (5a and 5c) are formed into a concavo-convex shape. However, the separators are not limited only to such a concavo-convex shape, and the separators may also have any arbitrary shape such as a flat plate shape or a partially concavo-convex shape, as long as the separators can exhibit the functions as gas flow channels and coolant flow channels.

[Separator]

The separator serves to electrically connect respective cells in series when a plurality of single cells of a fuel cell such as a polymer electrolyte fuel cell are connected in series to constitute a fuel cell stack. In addition, the separator also has a function as a partition wall, which separates a fuel gas, an oxidant gas, and a refrigerant from each other. In order to secure flow paths therefor, it is preferable that each of the separators is provided with gas flow paths and a cooling flow path as described above. As a material constituting the separator, conventionally known materials such as carbon such as dense carbon graphite and a carbon plate, and a metal such as stainless steel can be appropriately adopted without being limited. A thickness and size of the separator, a shape and size of each flow path to be provided, and the like are not particularly limited and can be appropriately determined in consideration of desired output characteristics and the like of a fuel cell to be obtained.

A method for producing a fuel cell is not particularly limited, and knowledge conventionally known in the field of fuel cells can be appropriately referred to.

Further, a fuel cell stack having a structure in which a plurality of membrane electrode assemblies (MEAs) are stacked via a separator and connected in series may be formed so that the fuel cell can exert a desired voltage. A shape and the like of the fuel cell are not particularly limited and may be appropriately determined so as to obtain cell characteristics such as a desired voltage.

The PEFC and membrane electrode assembly (MEA) described above use a catalyst layer exhibiting excellent power generation performance and durability. Consequently, the PEFC and the membrane electrode assembly (MEA) exhibit excellent power generation performance and durability.

The PEFC of the present embodiment and a fuel cell stack using the same can be mounted on, for example, a vehicle as a power source for driving.

A fuel cell such as described above exhibits excellent power generation performance. Here, the type of the fuel cell is not particularly limited, and in the explanation given above, a solid polymer type fuel cell has been explained as an example. However, in addition to these, examples of the fuel cell include an alkali type fuel cell, a direct methanol type fuel cell, and a micro fuel cell. Among them, a preferred example may be a solid polymer type fuel cell (PEFC) that is small-sized and is capable of having high density and high power output. Furthermore, the fuel cell is useful as a stationary power supply or the like, in addition to a power supply for a mobile body such as a vehicle having a limited mounting space. Above all, it is particularly preferable that the fuel cell is used as a power supply for a mobile body such as a vehicle where a high output voltage is required after stoppage of driving for a relatively long time.

The fuel used when the fuel cell is driven is not particularly limited. For example, hydrogen, methanol, ethanol, 1-propanol, 2-propanol, 1-butanol, secondary butanol, tertiary butanol, dimethyl ether, diethyl ether, ethylene glycol, and diethylene glycol can be used. Among them, hydrogen or methanol is preferably used from the viewpoint of being capable of obtaining high output power.

Furthermore, the application usage of the fuel cell is not particularly limited; however, it is preferable that the fuel cell is applied to vehicles. A membrane electrode assembly including the electrode catalyst of the present invention has excellent power generation performance and durability, and size reduction can be realized. Therefore, the fuel cell of the present invention is particularly advantageous when the fuel cell is applied to a vehicle, from the viewpoint of onboard mountability.

EXAMPLES

The effects of the present invention will be described using the following Examples and Comparative Examples. However, the technical scope of the present invention is not intended to be limited to the following Examples only. In the following Examples, unless particularly stated otherwise, the operation was carried out at room temperature (25° C.). Furthermore, unless particularly stated otherwise, the units "percent (%)" and "parts" mean "percent (%) by weight" and "parts by weight", respectively.

<Production of Electrode Catalyst>

Synthesis Example 1

46 g of acetylene black (OSAB, BET specific surface area: 800 m$^2$/g, average secondary particle size: 300 to 400 nm) as a catalyst support (manufactured by Denka Co., Ltd.), 1,000 g of a dinitrodiammine(II)platinum nitrate solution having a platinum concentration of 4.6% by weight (platinum content 46 g), and 100 mL of ethanol as a reducing agent were added, and the mixture was mixed for 7 hours at 80° C. Subsequently, platinum was chemically reduced. This was filtered and dried for 12 hours at room temperature (25° C.). Subsequently, the resultant was subjected to a heat treatment for 1 hour at 900° C. in a hydrogen atmosphere, and thus an electrode catalyst precursor was obtained. In regard to this electrode catalyst precursor, the physical property values of platinum were as follows: average crystallite diameter: 3.4 nm, supported ratio (with respect to the weight of the electrode catalyst precursor): 25.6% by weight, and specific surface area: 83 m$^2$/g.

Synthesis Example 2

Figure 6:
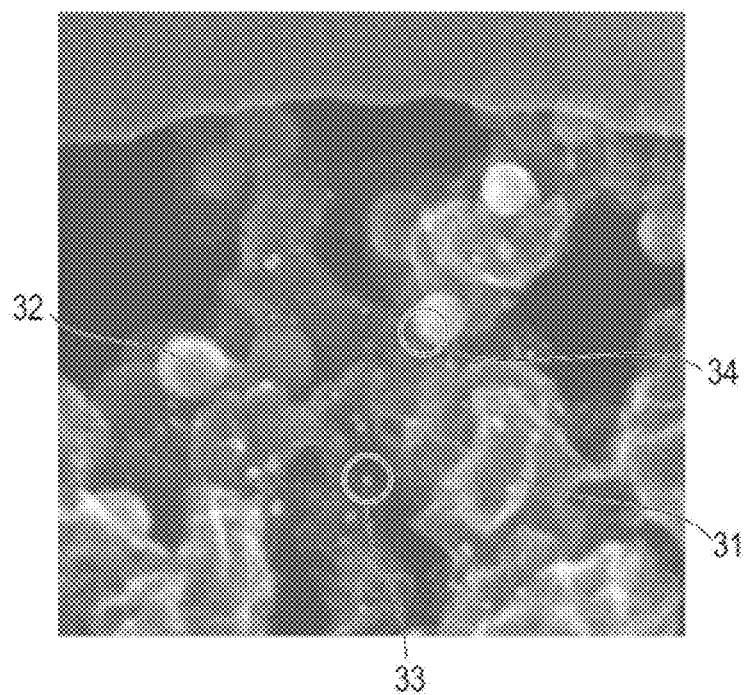
FIG. 6 is a SEM image of the electrode catalyst according to an embodiment of the present invention.

In regard to the electrode catalyst precursor obtained in Synthesis Example 1, SiO$_2$ particles as a spacer were supported, and thus an electrode catalyst 1 was produced. Specifically, 3.8 mg of SiO$_2$ particles (SNOWTEX (registered trademark) OXS manufactured by Nissan Chemical Industries, Ltd.) having an average primary particle size of 5 nm were dispersed in 25 mL of n-hexanol. 15 mg of the electrode catalyst precursor obtained in Synthesis Example 1 was added thereto, and the mixture was stirred for 4 hours at 25° C. This was filtered and then dried for 4 hours at 60° C., and thus an electrode catalyst 1 was obtained. In the electrode catalyst 1, the SiO$_2$ supported ratio was 5.4% by weight, and the ratio of the average diameter of the SiO$_2$ particles ($d_{sp}$) with respect to the average diameter of the platinum particles ($d_{cat}$) was 1.5. Furthermore, the results obtained by observing the surface of the electrode catalyst 1 by scanning electron microscopy (SEM) are shown in FIG. 6. In FIG. 6, reference numeral 31 represents a catalyst support; reference numeral 32 represents a SiO$_2$ particle; reference numeral 33 represents a platinum particle that are directly supported on the catalyst support; and reference numeral 34 represents a platinum particle supported on the catalyst carrier, with SiO$_2$ particles being interposed therebetween. As the result of SEM observation, the number of platinum particles supported on the catalyst support, with SiO$_2$ particles being interposed therebetween, was 2 with respect to any arbitrary 100 platinum particles supported on the catalyst support. That is, the number of platinum particles supported on the catalyst support, with SiO$_2$ particles being interposed therebetween, was 2% with respect to the total number of platinum particles supported on the catalyst support.

Synthesis Example 3

An electrode catalyst 2 was obtained in the same manner as in Synthesis Example 2, except that the SiO$_2$ particles having an average primary particle size of 5 nm used in Synthesis Example 2 were changed to SiO$_2$ particles having an average primary particle size of 12.5 nm (manufactured by Sigma-Aldrich Company, Product No. 637238). In the electrode catalyst 2, the SiO$_2$ supported ratio was 11.3% by weight, and the ratio of the average diameter of the SiO$_2$ particles ($d_{sp}$) with respect to the average diameter of the platinum particles ($d_{cat}$) was 3.7. Furthermore, according to a SEM observation, the number of platinum particles supported on the catalyst support, with SiO$_2$ particles being interposed therebetween, was 5% or less with respect to the total number of platinum particles supported on the catalyst support.

Synthesis Example 4

In regard to the electrode catalyst precursor obtained in Synthesis Example 1, Al$_2$O$_3$ particles were supported as a spacer, and thus an electrode catalyst was produced. Specifically, 1 mg of Al$_2$O$_3$ particles (manufactured by Sigma-Aldrich Company, Product No. 718475) having an average primary particle size of 13 nm were dispersed in 25 mL of n-hexanol, 15 mg of the electrode catalyst precursor obtained in Synthesis Example 1 was added thereto, and the mixture was stirred for 4 hours at 25° C. This mixture was filtered and dried, and thus an electrode catalyst 3 was obtained. In regard to the electrode catalyst 3, the $Al_2O_3$ supported ratio was 1.8% by weight, and the ratio of the average diameter of the $Al_2O_3$ particles ($d_{sp}$) with respect to the average diameter of the platinum particles ($d_{cat}$) was 3.8. Furthermore, according to a SEM observation, the number of platinum particles supported on the catalyst support, with $SiO_2$ particles being interposed therebetween, was 5% or less with respect to the total number of platinum particles supported on the catalyst support.

Synthesis Example 5

In regard to the electrode catalyst precursor obtained in Synthesis Example 1, $TiO_2$ particles were supported as a spacer, and thus, an electrode catalyst was produced. Specifically, 1 mg of $TiO_2$ particles (manufactured by Sigma-Aldrich Company, Product No. 718467) having an average primary particle size of 15 nm were dispersed in 25 mL of n-hexanol, 15 mg of the electrode catalyst precursor obtained in Synthesis Example 1 was added thereto, and the mixture was stirred for 4 hours at 25° C. This mixture was filtered and dried, and thus an electrode catalyst 4 was obtained. In regard to the electrode catalyst 4, the $TiO_2$ supported ratio was 7.9% by weight, and the ratio of the average diameter of the $TiO_2$ particles ($d_{sp}$) with respect to the average diameter of the platinum particles ($d_{cat}$) was 4.4. Furthermore, according to a SEM observation, the number of platinum particles supported on the catalyst support, with $SiO_2$ particles being interposed therebetween, was 5% or less with respect to the total number of platinum particles supported on the catalyst support.

Synthesis Example 6

In regard to the electrode catalyst precursor obtained in Synthesis Example 1, $Al_2O_3$ nanofibers were supported as a spacer, and thus an electrode catalyst was produced. Specifically, 1 mg of $Al_2O_3$ nanofibers having a diameter of 20 nm and a length of 10 μm (manufactured by Sigma-Aldrich Company, Product No.: 790915) were dispersed in 25 mL of n-hexanol, 15 mg of the electrode catalyst precursor obtained in Synthesis Example 1 was added thereto, and the mixture was stirred for 4 hours at 25° C. This mixture was filtered and dried, and thus an electrode catalyst 5 was obtained. In regard to the electrode catalyst 5, the $Al_2O_3$ supported ratio was 6.2% by weight, and the ratio of the average diameter of the $Al_2O_3$ nanofibers ($d_{sp}$) with respect to the average diameter of the platinum particles ($d_{cat}$) was 5.9. Furthermore, according to a SEM observation, the number of platinum particles supported on the catalyst support, with $SiO_2$ particles being interposed therebetween, was 5% or less with respect to the total number of platinum particles supported on the catalyst support.

Synthesis Example 7

Acetylene black (OSAB, BET specific surface area: 800 $m^2$/g, average secondary particle size: 300 to 400 nm) (manufactured by Denka Co., Ltd.) as a catalyst support, and $SiO_2$ particles (manufactured by Sigma-Aldrich Company, Product No. 637238) having an average primary particle size of 12.5 nm were dispersed in hexanol, and the mixture was stirred for 4 hours at 25° C. This mixture was filtered and then dried for 4 hours at 60° C. The powder (amount corresponding to 54 g of OSAB) obtained here, 1,000 g of a dinitrodiammine(II)platinum nitrate solution having a platinum concentration of 4.6% by weight (platinum content: 46 g), and 100 mL of ethanol as a reducing agent were added, and the mixture was mixed for 7 hours at 80° C. Subsequently, platinum was chemically reduced. This was filtered and dried for 12 hours at room temperature (25° C.), and then the resultant was subjected to a heat treatment for one hour at 900° C. in a hydrogen atmosphere. Thus, an electrode catalyst 6 was obtained. In regard to the electrode catalyst 6, the physical property values of platinum were as follows: average crystallite diameter: 3.5 nm, supported ratio (with respect to the weight of the electrode catalyst 6): 17.6% by weight, specific surface area: 105 $m^2$/g, and the spacer supported ratio with respect to the weight of the electrode catalyst 6 was 5.8% by weight. Furthermore, according to a SEM observation, the number of platinum particles supported on the catalyst support, with $SiO_2$ particles being interposed therebeween, was more than 30% with respect to the total number of platinum particles supported on the catalyst support.

<Production of Rotating Disc Electrode (RDE) Apparatus>

Comparative Example 1

13.25 mg of the electrode catalyst precursor produced in Synthesis Example 1, 0.1 mL of a 5 wt % electrolyte dispersion liquid (NAFION (registered trademark) D520 manufactured by DuPont Company) (specific gravity 1.0), and 25 mL of n-hexanol were sufficiently mixed, and a catalyst ink was produced. An aliquot of the catalyst ink equivalent to 20 μg of the amount of catalyst support was collected using a micropipette. The catalyst ink was dropped on a rotating disc electrode (RDE) apparatus (manufactured by HOKUTO DENKO CORPORATION) made of glassy carbon and having a diameter of 6 mm, and then the catalyst ink was dried for 24 hours at 25° C. Thus, an RDE apparatus coated with an electrode catalyst layer having a film thickness of 1 μm was produced.

Comparative Example 2

An RDE apparatus was produced in the same manner as in Comparative Example 1, except that the electrode catalyst precursor used in Comparative Example 1 was changed to 13.97 mg (amount of electrode catalyst precursor: 13.25 mg) of the electrode catalyst 1 produced in Synthesis Example 2.

Comparative Example 3

An RDE apparatus was produced in the same manner as in Comparative Example 1, except that the electrode catalyst precursor used in Comparative Example 1 was changed to 14.07 mg (amount of electrode catalyst precursor: 13.25 mg) of the electrode catalyst 6 produced in Synthesis Example 7.

Example 1

An RDE apparatus was produced in the same manner as in Comparative Example 1, except that the electrode catalyst precursor used in Comparative Example 1 was changed to 14.75 mg (amount of electrode catalyst precursor: 13.25 mg) of the electrode catalyst 2 produced in Synthesis Example 3.

Example 2

An RDE apparatus was produced in the same manner as in Comparative Example 1, except that the electrode catalyst precursor used in Comparative Example 1 was changed to 13.49 mg (amount of electrode catalyst precursor: 13.25 mg) of the electrode catalyst 3 produced in Synthesis Example 4.

Example 3

An RDE apparatus was produced in the same manner as in Comparative Example 1, except that the electrode catalyst precursor used in Comparative Example 1 was changed to 14.30 mg (amount of electrode catalyst precursor: 13.25 mg) of the electrode catalyst 4 produced in Synthesis Example 5.

Example 4

An RDE apparatus was produced in the same manner as in Comparative Example 1, except that the electrode catalyst precursor used in Comparative Example 1 was changed to 14.07 mg (amount of electrode catalyst precursor: 13.25 mg) of the electrode catalyst 5 produced in Synthesis Example 6.

<Evaluation of Performance of Rotating Disc Electrode>

Using the rotating disc electrode (RDE) apparatuses produced in Examples 1 to 4 and Comparative Examples 1 to 3, the oxygen reduction reaction (ORR) activity and the effective electrochemical surface area were measured by the following method, and thus the ORR specific activity was calculated. For the evaluation conditions and the evaluation protocol, reference was made to reference literature (Proposal of Goals, Research and Development Issues, and Evaluation Methods for Solid Polymer Type Fuel Cells, p. 17-22, Fuel Cell Commercialization Conference of Japan (FCCJ), January 2011).

Specifically, first, an RDE apparatus was sufficiently cleaned by ultrasonic cleaning and boiling water washing, and a liquid electrolyte (perchloric acid, $HClO_4$) adjusted to a concentration of 0.1 M was poured onto the RDE apparatus. Next, while the RDE apparatus was controlled to be at 25° C., nitrogen bubbling was performed in the RDE apparatus. In a state in which the speed of rotation of the electrode was set to zero, cyclic voltammetry was performed in order to perform cleaning of the electrode surface and measurement of the surface area. The potential range was set to 0.05 to 1.20 V vs. RHE, and the scan rate was 50 mV/s. After a reproducible voltammogram was obtained, the effective electrochemical surface area ($m^2/g\_Pt$) of platinum was calculated from the electric amount of hydrogen adsorption and the platinum weight of the electrode according to the reference literature described above. Subsequently, oxygen (purity 99.99995% or higher) was bubbled for about 30 minutes. After completion of bubbling, convection voltammetry was performed under the conditions of a scan rate of 10 mV/s in the direction of potential scan of 0.05 V to 1.2 V, and the current value (A) at a potential of 0.9 V was measured. The ORR activity (A/g_Pt) of the RDE apparatus was calculated using this value, and the ORR specific activity ($\mu A/cm^2\_Pt$) was calculated by dividing the ORR activity by the effective electrochemical surface area.

The evaluation results for the RDE apparatuses according to Examples 1 to 4 and Comparative Examples 1 to 3 are presented in Table 1.

TABLE 1

|  | $d_{sp}/d_{cat}$ | ORR activity (A/g_Pt) | Effective electrochemical surface area ($m^2/g\_Pt$) | ORR specific activity ($\mu A/cm^2\_Pt$) |
| --- | --- | --- | --- | --- |
| Comparative Example 1 | — | 127 | 51 | 250 |
| Comparative Example 2 | 1.5 | 130 | 66 | 196 |
| Comparative Example 3 | 3.7 | 120 | 66 | 182 |
| Example 1 | 3.7 | 160 | 44 | 364 |
| Example 2 | 3.8 | 147 | 50 | 296 |
| Example 3 | 4.4 | 191 | 62 | 309 |
| Example 4 | 5.9 | 133 | 45 | 298 |

From the results of Table 1, it was found that an RDE having the electrode catalyst according to the present invention in the electrode catalyst layer exhibits excellent catalytic activity (ORR specific activity). From these results, it is speculated that the electrode catalyst of the present invention has enhanced arrival efficiency of reactive gas ($O_2$) to the catalyst metal particle surface due to the effect of the spacer, and can exhibit high catalytic activity.

Incidentally, the present patent application is based on Japanese Patent Application No. 2016-112177, filed in Japan on Jun. 3, 2016, the entire disclosure of which is incorporated herein by reference.

REFERENCE SIGNS LIST

1 Solid polymer type fuel cell (PEFC)
2 Solid polymer electrolyte membrane
3 Catalyst layer
3a Anode catalyst layer
3c Cathode catalyst layer
4a Anode gas diffusion layer
4c Cathode gas diffusion layer
5a Anode separator
5c Cathode separator
6a Anode gas flow channel
6c Cathode gas flow channel
7 Coolant flow channel
10 Membrane electrode assembly (MEA)
20 Electrode catalyst
21 Catalyst support
22, 22' Catalyst metal particle
23 Spacer
24 Outer circumferential region
25 Center of catalyst support
26 Circle circumscribing catalyst metal particle
27 Circle circumscribing spacer
28 Electrolyte
29 Void
31 Catalyst support
32 $SiO_2$ particle
33 Platinum particle directly supported on catalyst support
34 Platinum particle supported on catalyst support, with $SiO_2$ particle being interposed therebetween

The invention claimed is:
1. An electrode catalyst comprising a catalyst metal particle and a spacer supported on a catalyst support,
wherein a ratio ($d_{sp}/d_{cat}$) of an average diameter of the spacer ($d_{sp}$) with respect to an average diameter of the catalyst metal particle ($d_{cat}$) is from 3.5 to 10, and wherein the number of the catalyst metal particles supported on the catalyst support, with the spacer being interposed therebetween, is 30% or less with respect to the total number of the catalyst metal particles.

2. The electrode catalyst according to claim 1, wherein the ratio $d_{sp}/d_{cat}$ is from 3.7 to 6.0.

3. The electrode catalyst according to claim 1, wherein the number of the catalyst metal particles supported on the catalyst support, with the spacer being interposed therebetween, is less than 20% with respect to the total number of the catalyst metal particles.

4. The electrode catalyst according to claim 1, wherein the spacer is formed of a metal oxide.

5. The electrode catalyst according to claim 1, wherein the spacer includes at least one selected from $SiO_2$, $Al_2O_3$, and $TiO_2$.

6. The electrode catalyst according to claim 1, wherein the spacer has a granular shape or a fiber shape.

7. A method for producing the electrode catalyst set forth in claim 1, the method comprising:
   supporting a catalyst metal particle on a catalyst support to produce an electrode catalyst precursor; and
   mixing the electrode catalyst precursor with a spacer to produce the electrode catalyst.

8. An electrode catalyst layer comprising the electrode catalyst set forth in claim 1.

\* \* \* \* \*